Feb. 26, 1935.   H. W. MATTINGLY   1,992,536
BOX STRAPPING MACHINE
Filed May 18, 1934
Fig. 1.
Fig. 2.
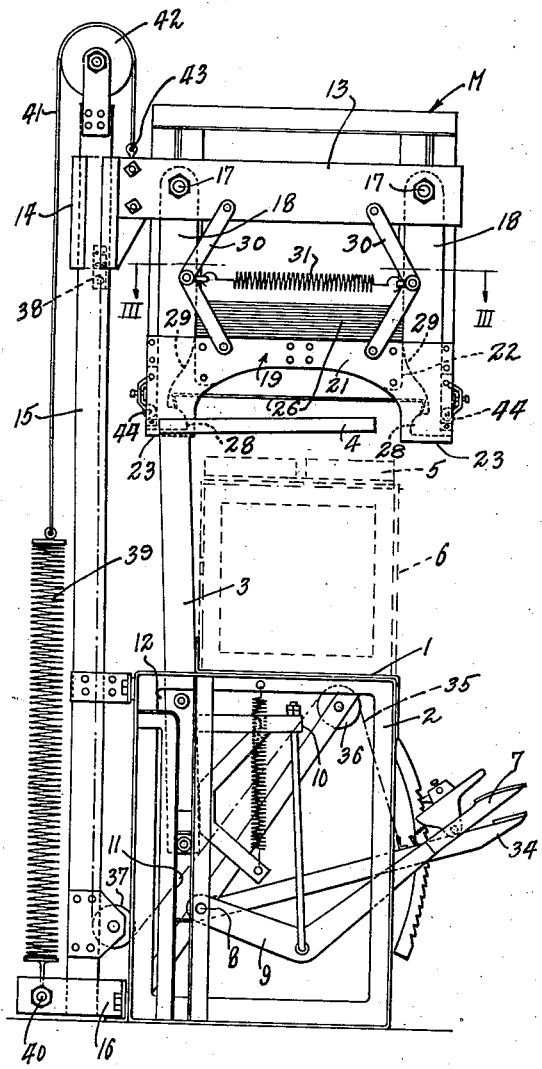
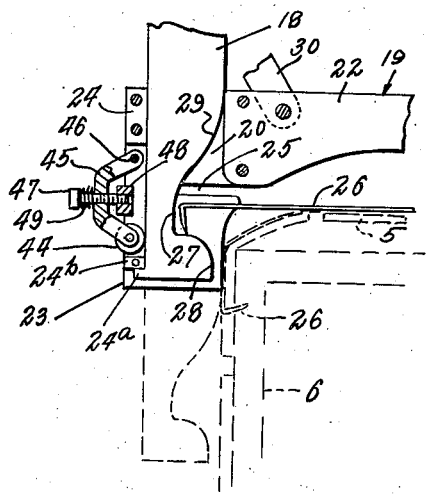
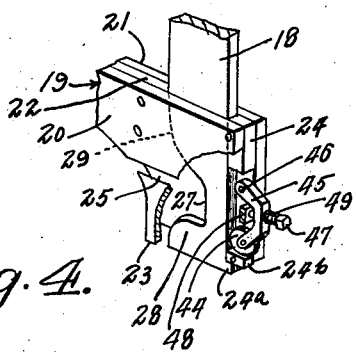
Fig. 3.
Fig. 4.
Inventor
Harold W. Mattingly
By Lyon & Lyon
Attorneys Patented Feb. 26, 1935

1,992,536

UNITED STATES PATENT OFFICE 1,992,536

BOX STRAPPING MACHINE

Harold W. Mattingly, Los Angeles, Calif., assignor to Donald Parker and Citizens National Trust and Savings Bank of Riverside, administrators of George D. Parker, deceased Application May 18, 1934, Serial No. 726,333

10 Claims. (Cl. 140—93)

My invention relates to box strapping machines, and has particular reference to machines for applying metal straps across the covers of boxes, particularly boxes in which the contents protrude above the upper edges of the box.

In the fruit and vegetable packing industries, it is common practice to pack boxes, or other containers, with fruit and vegetables and the like so that the contents extend considerably above the upper edges of the box, and so that during shipment and storage of the same any shrinkage which will occur in the vegetables or fruits will be compensated for by a followup action of the cover on the box to maintain the contents of the box tight within the box even after such shrinkage occurs.

The most common practice is to overfill a box and then apply a cover to the box formed of relatively thin material so that the cover ends may be sprung down into contact with the box ends and secured thereto, while the central portion of the cover is permitted to bulge over the protruding contents of the box, and is arranged to have a wire or other metal strap placed transversely across the center of the box to hold the center of the cover down in tensioned relation upon the contents.

It has been the practice in this art to apply such wire or metal straps to a box by first compressing the cover down upon the fruit at the central portion of the cover and then applying a wire strap by forming the same over the cover while it is depressed and driving the ends of the strap into the side walls of the box, or securing the strap to the cover by driving nails through the ends of the strap which are extended along the side walls of the box.

It is an object of my invention to provide a machine for applying such straps across the centers of box covers which may be self-contained and may comprise a unit attachable to machines already in use for placing covers upon boxes, or for nailing covers upon boxes.

Another object of the invention is to provide a strapping mechanism for applying straps across the centers of boxes in which the straps may be formed over the side edges of the box and driven into the sides of the box by a wedging action.

Another object of the invention is to provide a strapping mechanism for applying straps to covers of boxes, in which driving members may be employed to support a strap above the covers of boxes, and in which the driving members may be moved directly toward the box to place the strap upon the box to then drive, or otherwise secure, the strap to the box.

Other objects and advantages will be apparent from a study of the following specifications read in connection with the accompanying drawing, wherein Figure 1 is a side elevational view of a strapping machine constructed in accordance with my invention;

Fig. 2 is a detail view of a portion of the machine shown in Fig. 1, illustrating the press shoe and strap-forming and driving apparatus;

Fig. 3 is a horizontal sectional view taken along line III—III of Fig. 1; and

Fig. 4 is a detail perspective view of a portion of the press shoe and strap driving mechanism employed in the practice of my invention.

Referring to the drawing, I have illustrated my strap applying mechanism as forming a unit constituting an attachment which may be associated with other existing machines for applying covers to boxes.

In Fig. 1 I have illustrated the machine as adapted to be associated with the ordinary manual press employed in the packing industry for manually springing covers down upon the boxes prior to nailing the same thereto. Such cover presses usually comprise a box supporting table 1 which is secured at any suitable convenient height upon end frames 2. The cover-pressing mechanism of such presses usually comprises one or more upstanding bars 3, the upper ends of which are provided with forwardly extending arms 4 arranged to extend across the covers 5 of boxes 6 which may be placed upon the table 1 so that by drawing the bars 3 downwardly the arms 4 will engage the cover near its end and spring the ends of the cover down into contact with the next of the boxes 6 ready to be nailed thereto.

The bars 3 are usually arranged to be drawn downwardly by suitable foot pedal mechanism 7 pivoted upon an axle 8 and connected through a link 9 and bracket 10 to the bars 3 so that depression of the foot pedal 7 will pull the bars 3 and arms 4 downwardly. Some of these presses may also include guideways 11 for the bars 3 which extend rearwardly of the machine at their upper ends 12 to permit the bars 3 to be swung rearwardly of the machine when in elevated position to allow a greater amount of room for a person to place the box upon the table and arrange it thereon prior to the actual pressing operations.

I have illustrated my strap-applying mechanism as being mounted above the supporting table 1 and as comprising a main cross-head 13 slidably mounted as at 14 upon a suitable upright 15 which may constitute a portion of the cover press, or may be supplied as a separate attachment thereto, in which event the upright 15 may be secured by suitable brackets 16 to the rear of the cover press.

The cross-head 13 has pivotally secured thereto, as at 17, a pair of driving bars 18, spaced from each other by an amount slightly in excess of the width of a box upon which the machine will operate.

The lower ends of the bars 18 constitute a sliding support for a press shoe 19 which press shoe includes a pair of plates 20 and 21 separated from each other by a filler plate 22. The plates 20 and 21 extend over the width of a box and to a considerable distance beyond the ends of the box so that the downwardly extending portions 23 of the plates 21 will pass downwardly along the sides of the box when the press shoe 19 is in contact with the cover 5, the filler plate 22 terminating in substantial alignment with the side edges of a box placed upon the table 1 so that the space beyond the ends of the filler plate 22 constitutes a slideway through which the drive bars 18 may slide relative to the press shoe 19.

The extreme outer edges of the plates 20 and 21 are connected together by a bearing block 24 which constitutes a slide bearing against which the outer edge of the drive bar 18 may press when the drive bar 18 is moved downwardly to perform its driving functions. The extreme lower end of the drive bars 18 may be provided with a projection 24a to engage below a block 24b secured to the plates 20 and 21 to form a limit of downward motion of the press shoe 19 relative to the drive bars 18, and thus permit the bars 18 to constitute a support for the press shoe 19.

As shown in Fig. 4, the rear plate 20 may be provided with a suitable slot 25 through which straps 26 may be fed from a magazine M of the type shown in the George D. Parker Patent No. 1,777,474, granted October 7, 1930, so that the strapping mechanism of my invention may be adapted to receive straps from an automatic feeding mechanism, such as is shown in that patent, and the magazine M may be secured to and carried by the press shoe 19 so as to follow the movements of the press shoe.

It will be observed that the lower ends of the driving bars 18 are provided with laterally extending recesses 27 into which the straps 26 may be fed, the recesses 27 being adjacent the slot 25 when the cross-head 13 is in its normally elevated position, as shown in Fig. 1. The extreme end of the driving bars 18 is provided with a laterally extending shoe 28 which constitutes a shelf upon which the ends of the strap 26 may rest, and constitutes a strap-supporting mechanism for holding the strap in the position shown in Fig. 1, prior to downward movement of the cross-head 13.

It will also be observed that immediately above the recess 27 the driving bars 18 are formed with cam-like surfaces 29 directed toward the sides of the boxes 6, so that as the driving bars 18 move downwardly relative to the press shoe 19, the bars will first release the strap 26 from its support upon the feet 28 and then further movement of the driving bars will engage the ends of the strap and bend them around the side edges of the cover, and finally drive the ends of the strap into the side walls of the box 6.

In order to permit the initial movements of the cross-head 13 to first press the press shoe 19 into pressing contact with the cover and then to permit the drive bars to move relative to the press shoe to bend the ends of the strap down over the box and to secure the same to the box, the press shoe is mounted upon the cross-head 13 by means of toggle arms 30. I have illustrated two of these toggle arms connecting one side of the cross-head 13 with one side of the press shoe 19 and a corresponding pair of toggle arms connecting the opposite side of the cross-head with the opposite side of the press shoe, so that a uniform pressure may be applied to the press shoe. The toggle arms on the forward side of the machine as illustrated in Fig. 1, are connected together by means of a spring 31, and it will be observed that the spring 31 exerts a tension through the toggle arms 30, in the position shown in Fig. 1, sufficient to force the press shoe against the cover of the box when the cross-head 13 is moved downwardly to accomplish the pressing action. However, as the cross-head 13 moves further toward the box, the tension spring 31 will be expanded by reason of the expansion of the toggle arms relative to each other. By properly selecting the length of the toggle arms and the tension of the spring 31, it will be apparent that the further the cross-head 13 moves toward the press shoe 19 (after the press shoe has been stopped by pressing contact with the box), the spring 31, though extended, will exert its force against the toggle arms which have been flattened out, thus maintaining a constant pressure upon the press shoe irrespective of the movement of the cross head 13. A similar spring 32 may be employed to connect the toggles 30 on the opposite side of the cross-head and press shoe 19, as is illustrated particularly in Fig. 3.

It will be observed that when the press shoe is stopped in its downward movement by pressure upon the cover 5, the driving bars will continue to move downwardly and will, by virtue of their cam surfaces 29, tend to hold the strap 26 over the side edges of the cover and secure the same to the side walls of the box.

The operation of the cross-head 13 to apply a strap to the cover, may be accomplished either manually, as shown herein, or may be accomplished by power in the manner shown in the George D. Parker patent hereinbefore referred to, all that is necessary being to apply pressure drawing the cross-head 13 down toward the box a sufficient distance to insure the complete performance of the driving action of the driving bars 18.

I have shown the operation as being performed manually by providing an additional pedal 34 upon the cover press machine, which may be pivoted upon the shaft 8 and may be connected through a suitable cable 35, running over pulleys 36 and 37 to a point of attachment 38 upon the cross-head 13 so that either while the arms 4 are performing their pressing operation upon the cover, the cross-head 13 may be moved downwardly to perform the strap-applying functions, or the pedal 34 may be operated after the pressing functions of the arms 4 have been completed.

I prefer to provide suitable means for returning the cross-head 13 to its elevated position, as shown in Fig. 1, which may be of any suitable character, illustrated herein as comprising a tension spring 39 secured to the bracket 16 as at 40, the upper end of the spring being connected through a suitable cable 41 passing over a pulley 42 supported upon the upper end of the upright 15 and passing through a suitable point of connection 43 upon the upper edge of the cross-head 13.

It will be understood by those skilled in the art that the width of the boxes 6 may vary, due to inaccuracy in constructing the boxes, or due to the necessity for employing heavier boards on the boxes in some instances, such as for what is known as "exporting" boxes, and for this reason the bearing blocks 24 are spaced apart a sufficient distance to permit the driving bars 18 to pass downwardly alongside the greatest width of box expected to be encountered.

Therefore it is desirable that the driving bars should be normally urged inwardly toward the sides of the box to insure that the wedging action of the cam surfaces 29 of the driving bars should press the ends of the strap 26 tightly against the sides of the box, and for this purpose I have provided a pressure member for each of the bars 18, tending to move these bars toward each other to press the ends of the strap snugly against the sides of the box. This pressure member may comprise a suitable wheel 44 journaled in a bearing bracket 45, pivoted as at 46 to the plates 20 and 21 of the press shoe 19. A screw 47 may be provided to engage a block 48 secured to the plates 20 and 21 with a suitable heavy spring 49 interposed between the bracket 45 and the head of the screw 47, whereby adjustment of the screw 47 may, through the agency of spring 49, exert any desired lateral pressure upon the driving bars 18.

While I have shown and described the preferred embodiment of my invention, I do not desire to be limited to any of the details of construction shown herein, except as defined in the appended claims.

I claim:

1. In a machine for applying straps to covers of boxes, means for supporting a box, a cross-head, means mounting said cross-head for movement toward and away from a box on said support, a pair of drive bars carried by said cross-head for engaging a strap and securing the same to a box as said cross-head moves toward said box, and a press shoe carried by said drive bars for engaging a cover and applying pressure thereto during the strap-forming operation.

2. In a device for applying straps to boxes, means for supporting a box, a cross-head, means mounting said cross-head for movement toward and away from a box upon said support, a press shoe, means mounting said press shoe upon said cross-head for movement therewith until a predetermined pressure is exerted between said cross-head and said press shoe, and a pair of drive bars secured to said cross-head and slidable relative to said press shoe for engaging a strap and securing the same to a box upon movement of said cross-head relative to said press shoe.

3. In a device for applying straps to boxes, means for supporting a box, a cross-head, means mounting said cross-head for movement toward and away from a box on said support, a pair of drive bars secured to said cross-head and movable therewith, a press shoe, means on said press shoe for constituting slide bearings for said drive bars, means mounting said press shoe on said cross-head for movement therewith until a predetermined pressure is exerted between said press shoe and said cross-head, whereby said drive bars are moved relative to said press shoe by further movement of said cross-head.

4. In a device for applying straps to boxes, means for supporting a box, a cross-head, means mounting said cross-head for movement toward and away from a box on said support, a pair of drive bars secured to said cross-head and movable therewith, a press shoe, means on said press shoe for constituting slide bearings for said drive bars, means mounting said press shoe on said cross-head for movement therewith until a predetermined pressure is exerted between said press shoe and said cross-head, whereby said drive bars are moved relative to said press shoe by further movement of said cross-head, means on said drive bars for engaging a strap placed beneath said press shoe and for pressing said strap over said box and securing the strap thereto.

5. In a device for applying straps to boxes, means for supporting a box, a cross-head, means mounting said cross-head for movement toward and away from a box on said support, a pair of drive bars secured to said cross-head and movable therewith, a press shoe, means on said press shoe for constituting slide bearings for said drive bars, means mounting said press shoe on said cross-head for movement therewith until a predetermined pressure is exerted between said press shoe and said cross-head, whereby said drive bars are moved relative to said press shoe by further movement of said cross-head, and means for exerting lateral pressure upon said drive bars during movement of said bars relative to said press shoe.

6. In a device for applying straps to boxes, means for supporting a box, a cross-head, means mounting said cross-head for movement toward and away from a box on said support, a pair of drive bars secured to said cross-head but extending toward said support, cam surfaces formed on the edges of said drive bars for engaging straps placed upon the box and for bending the strap over the sides of the box and for securing the ends of the strap to the box, a press shoe connecting the lower ends of said drive bars and constituting slide bearings for holding the guide bars in alignment with the sides of the box during the strap bending and securing operations.

7. In a device for applying straps to boxes, means for supporting a box, a cross-head, means mounting said cross-head for movement toward and away from a box on said support, a pair of drive bars secured to said cross-head but extending toward said support, cam surfaces formed on the edges of said drive bars for engaging straps placed upon the box and for bending the strap over the sides of the box and for securing the ends of the strap to the box, a press shoe connecting the lower ends of said drive bars and constituting slide bearings for holding the guide bars in alignment with the sides of the box during the strap bending and securing operations, and means on said press shoe for engaging a cover of a box and compressing the same prior to the bending and securing of the strap to the box.

8. In a device for applying straps to boxes, means for supporting a box, a cross-head, means mounting said cross-head for movement toward and away from a box on said support, a pair of drive bars secured to said cross-head but extending toward said support, cam surfaces formed on the edges of said drive bars for engaging straps placed upon the box and for bending the strap over the sides of the box and for securing the ends of the strap to the box, a press shoe connecting the lower ends of said drive bars and constituting slide bearings for holding the guide bars in alignment with the sides of the box during the strap bending and securing operations, and means connecting said press shoe with said cross-head for moving said press shoe into pressing relation with said box and thereafter permitting said cross-head to move relative to said press shoe to perform the strap bending and securing operations.

9. In a device for applying straps to boxes, means for supporting a box, a cross-head, means mounting said cross-head for movement toward and away from a box on said support, a pair of drive bars pivotally secured to said cross-head and movable therewith from positions above a box to positions along the sides of said box, and means resiliently urging said drive bars toward the sides of said box.

10. In a device for applying straps to boxes, means for supporting a box, a cross-head, means mounting said cross-head for movement toward and away from a box on said support, a pair of drive bars pivotally secured to said cross-head and movable therewith from positions above a box to positions along the sides of said drive bars toward the sides of said box, means for resiliently urging said drive bars toward the sides of said box and means for adjusting the force exerted by said resilient urging means.

HAROLD W. MATTINGLY.